(12) United States Patent
Wright et al.

(10) Patent No.: US 9,844,207 B1
(45) Date of Patent: Dec. 19, 2017

(54) TUG-TOY TOOTH BRUSH

(71) Applicant: OWL Innovations, LLC, Cottonwood Heights, UT (US)

(72) Inventors: Samuel Wayne Wright, Sandy, UT (US); Brian Coutts, Centerville, UT (US); Tyler Brown, Sandy, UT (US)

(73) Assignee: OWL INNOVATIONS, LLC., Cottonwood Heights, UT (US)

( * ) Notice: Subject to any disclaimer, the term of this patent is extended or adjusted under 35 U.S.C. 154(b) by 0 days.

(21) Appl. No.: 15/617,954

(22) Filed: Jun. 8, 2017

Related U.S. Application Data

(60) Provisional application No. 62/498,653, filed on Jan. 4, 2017.

(51) Int. Cl.
| | |
|---|---|
| *A01K 15/02* | (2006.01) |
| *A01K 13/00* | (2006.01) |
| *A46B 15/00* | (2006.01) |
| *A46B 5/02* | (2006.01) |
| *A46B 5/00* | (2006.01) |
| *A46B 7/10* | (2006.01) |
| *A46B 9/04* | (2006.01) |
| *A46B 9/06* | (2006.01) |
| *A46B 3/00* | (2006.01) |
| *A46B 7/04* | (2006.01) |

(52) U.S. Cl.
CPC .......... *A01K 15/026* (2013.01); *A01K 13/001* (2013.01); *A46B 3/00* (2013.01); *A46B 5/0033* (2013.01); *A46B 5/02* (2013.01); *A46B 7/044* (2013.01); *A46B 7/10* (2013.01); *A46B 9/04* (2013.01); *A46B 9/06* (2013.01); *A46B 15/0055* (2013.01); *A46B 2200/1086* (2013.01)

(58) Field of Classification Search
CPC ...... A01K 15/026; A01K 15/025; A61D 5/00; A46B 2200/1086; A46B 7/044; A46B 7/06
USPC ....... 119/702, 707, 708, 709, 710, 711, 600; 433/1
See application file for complete search history.

(56) References Cited

U.S. PATENT DOCUMENTS

| | | | | |
|---|---|---|---|---|
| 3,830,202 | A | * | 8/1974 | Garrison .............. A01K 15/025 119/709 |
| 5,174,243 | A | * | 12/1992 | O'Rourke ............ A01K 15/026 119/709 |
| D346,048 | S | * | 4/1994 | Jandebeur ...................... D1/199 |

(Continued)

OTHER PUBLICATIONS

"Patentability Search Report—The K9 Rotary Toothbrush" Effectual Knowledge Services Pvt. Ltd., Apr. 3, 2017, 28 pages.

(Continued)

*Primary Examiner* — Yvonne Abbott-Lewis
(74) *Attorney, Agent, or Firm* — Workman Nydegger

(57) ABSTRACT

Embodiments are directed to a tug-toy tooth brush. In one example, the tug-toy tooth brush includes a structural frame that provides support for at least one sliding element. The structural frame includes channels that guide the sliding element while sliding within the structural frame. The sliding element is configured to slide from a first position to a second position within the structural frame. The sliding element includes bristles that extrude through the structural frame. The tug-toy tooth brush also includes at least one handle attached to a distal end of the sliding element, where the handle is configured for travel through the structural frame.

19 Claims, 5 Drawing Sheets

(56) References Cited

U.S. PATENT DOCUMENTS

| | | | | |
|---|---|---|---|---|
| 5,329,881 A | * | 7/1994 | O'Rourke | A01K 15/026 119/709 |
| 5,711,254 A | * | 1/1998 | O'Rourke | A01K 15/026 119/710 |
| 5,865,146 A | * | 2/1999 | Markham | A01K 15/026 119/707 |
| 5,944,516 A | * | 8/1999 | Deshaies | A61D 5/00 15/167.1 |
| 6,050,224 A | | 4/2000 | Owens | |
| 6,405,681 B1 | * | 6/2002 | Ward | A01K 15/026 119/707 |
| 6,601,539 B1 | * | 8/2003 | Snook | A01K 15/026 119/710 |
| 8,033,253 B2 | * | 10/2011 | Ritchey | A01K 15/025 119/707 |
| 8,468,977 B2 | * | 6/2013 | Markham | A01K 15/025 119/709 |
| 8,701,598 B1 | * | 4/2014 | Crabtree | A01K 15/026 119/709 |
| 8,935,992 B2 | * | 1/2015 | Axelrod | A01K 15/026 119/709 |
| D751,266 S | * | 3/2016 | Donatucci | D1/106 |
| 9,629,338 B2 | * | 4/2017 | Bianchi | A01K 15/026 |
| 2008/0201881 A1 | * | 8/2008 | Dunn | A01K 15/026 15/106 |
| 2010/0147227 A1 | | 6/2010 | Lind | |
| 2013/0092097 A1 | | 4/2013 | Cooper | |
| 2013/0255590 A1 | * | 10/2013 | Wagstaff | A01K 13/003 119/651 |
| 2014/0342298 A1 | * | 11/2014 | Lynch | A61D 5/00 433/1 |
| 2015/0090193 A1 | * | 4/2015 | Giarrizzo | A01K 15/026 119/709 |
| 2017/0135462 A1 | * | 5/2017 | Willi | A46B 7/02 |

OTHER PUBLICATIONS

Viller, "3 Pcs Set Dog Toys Dog Chew Toy for Aggressive Chewers for Small Medium Dogs Breeds Dogs Puppies—Knots Rope" Amazon.com, retrieved on Jun. 16, 2017, available at https://www.amazon.com/dp/B01EWSXFAC?psc=1.

"Pet Toys Teething Stick Natural Rubber Molar Tooth Cleaning Bone with Rope OE" eBay.com, retrieved on Jun. 16, 2017, available at http://www.ebay.com/itm/Pet-Toys-Teething-Stick-Natural-Rubber-Molar-Tooth-Cleaning-Bone-with-Rope-OE/112263172559?_trksid=p2047675.c100005.m1851&_trkparms=aid%3D222007%26algo%3DSIC.MBE%26ao%3D2%26asc%3D40130%26meid%3D44bc604361e74396a588fbb241897687%26pid%3D100005%26rk%3D1%26rkt%3D3%26sd%3D25265-0530101&autorefresh=true.

Leaps & Bounds, "Rubber Tube Rope Dog Rope Toy" Petco.com, retrieved on Jun. 16, 2017, available at http://www.petco.com/shop/en/petcostore/product/leaps-and-bounds-rubber-tube-rope-dog-toy#.

Mr. Play, "Dog Chew Toy Puppy Teeth Cleaning Knotted Dog Rope Toy Best For Aggressive Chewers Puppies Tug Toy For Small Medium Breeds" Amazon.com, retrieved on Jun. 16, 2017, available at :https://www.amazon.com/Cleaning-Knotted-Aggressive-Chewers-Puppies/dp/B01KIOKX8Q/ref=sr_1_22?s=pet-supplies&ie=UTF8&qid=1490761687&sr=1-22&keywords=chew+toy+for+dog+with+rope.

* cited by examiner

TUG-TOY TOOTH BRUSH

CROSS-REFERENCE TO RELATED APPLICATIONS

This application claims priority to and the benefit of U.S. Provisional Patent Application No. 62/498,653, entitled "K-9 Rotary Toothbrush," filed on Jan. 4, 2017, which application is incorporated by reference herein in its entirety.

BACKGROUND

Pet owners across the world do many things to care for their pets. For instance, many pet owners buy toys for their pets. These toys can take a variety of different forms, sizes, shapes and colors. Some toys are designed for specific animals, such as dogs or cats. Toys for dogs are usually made to be chewable, and are designed to be tough enough to withstand dogs' large bite forces. These chewable dog toys may be made of rubber, plastic, rope, or other material that dogs can repeatedly chew.

BRIEF SUMMARY

Embodiments described herein are directed to a tug-toy tooth brush. In one embodiment, the tug-toy tooth brush tug-toy tooth brush includes the following: a structural frame that provides support for at least one sliding element. The structural frame includes channels that guide the sliding element while sliding within the structural frame. The sliding element is configured to slide from a first position to a second position within the structural frame. The sliding element includes bristles that extrude through the structural frame. The tug-toy tooth brush also includes at least one handle attached to a distal end of the sliding element, where the handle is configured for travel through the structural frame.

In another embodiment, a tug-toy tooth brush is provided that includes an outer structure that houses an inner structure. The outer structure includes perforations that facilitate contact with an animal's teeth. The inner structure is positioned within the outer structure, and the inner structure is permitted to move within the outer structure. The inner structure includes bristles that extend through perforations of the outer structure. The tug-toy tooth brush also includes a handle attached to one end of the inner structure, where the handle is permitted to move through an opening in the outer structure, as well as another handle attached to the other end of the inner structure, where the other handle is permitted to move through a different opening in the outer structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
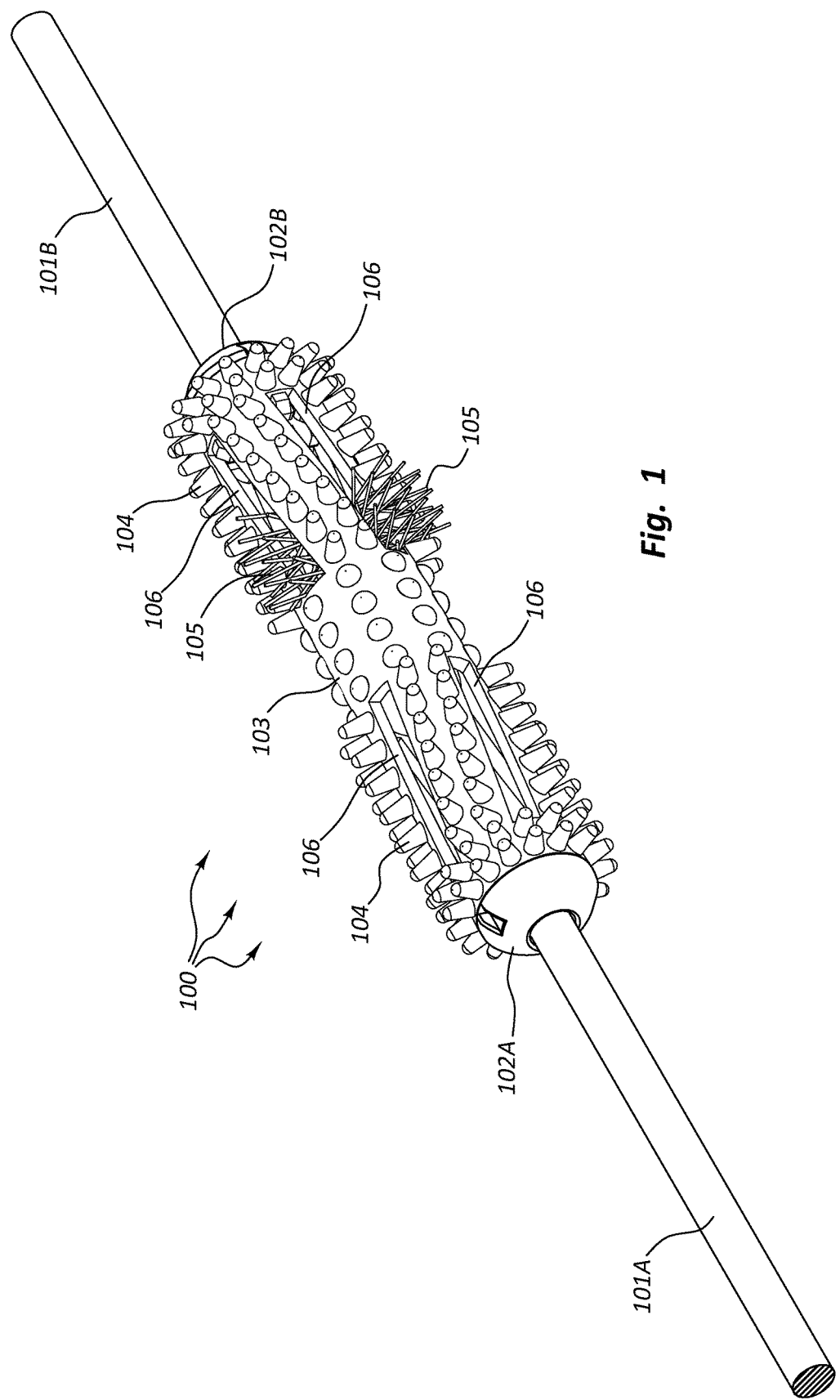
FIG. 1 illustrates a front perspective view of a tug-toy tooth brush.

Before describing the present disclosure in detail, it is to be understood that this disclosure is not limited to the specific parameters of the particularly exemplified systems, apparatus, assemblies, products, devices, kits, methods, and/or processes, which may, of course, vary. It is also to be understood that much, if not all of the terminology used herein is only for the purpose of describing particular embodiments of the present disclosure, and is not necessarily intended to limit the scope of the disclosure in any particular manner. Thus, while the present disclosure will be described in detail with reference to specific configurations, embodiments, and/or implementations thereof, the descriptions are illustrative only and are not to be construed as limiting the scope of the claimed invention.

Various aspects of the present disclosure, including devices, systems, methods, etc., may be illustrated with reference to one or more exemplary embodiments or implementations. As used herein, the terms "exemplary embodiment" and/or "exemplary implementation" mean "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

Furthermore, unless defined otherwise, all technical and scientific terms used herein have the same meaning as commonly understood by one of ordinary skill in the art to which the present disclosure pertains. While a number of methods, materials, components, etc. similar or equivalent to those described herein can be used in the practice of the present disclosure, only certain exemplary methods, materials, components, etc. are described herein.

It will be noted that, as used in this specification and the appended claims, the singular forms "a," "an" and "the" include plural referents unless the content clearly dictates otherwise. Thus, for example, reference to a "column" includes one, two, or more columns. Similarly, reference to a plurality of referents should be interpreted as comprising a single referent and/or a plurality of referents unless the content and/or context clearly dictate otherwise. Thus, reference to "columns" does not necessarily require a plurality of such columns. Instead, it will be appreciated that independent of conjugation; one or more columns are contemplated herein.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct association between two components or, where appropriate, an indirect association with one another through intervening or intermediate components. In contrast, when a component is referred to as being "directly coupled", "directly attached", "directly connected," and/or "directly joined" to another component, no intervening elements are present or contemplated.

Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "forward," "rear," "left," "right," "up," "down," "upper," "lower," "inner," "outer," "internal," "external," "interior," "exterior," "anterior," "posterior," "proximal," "distal," and the like can be used only for convenience and/or solely to indicate relative directions and/or orientations and may not otherwise be intended to limit the scope of the disclosure, including the specification, invention, and/or claims. According, such directional and/or arbitrary terms are not to be construed as necessarily requiring a specific order or position.

To facilitate understanding, like reference numerals have been used, where possible, to designate like elements common to the figures. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number.

In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where two or more values, or a range of values (e.g., less than, greater than, at least, and/or up to a certain value, and/or between two recited values) is disclosed or recited, any specific value or range of values falling within the disclosed values or range of values is likewise disclosed and contemplated herein. Thus, disclosure of an illustrative measurement or distance less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

Various modifications can be made to the illustrated embodiments without departing from the spirit and scope of the invention as defined by the claims. Thus, while various aspects and embodiments have been disclosed herein, other aspects and embodiments are contemplated. It is also noted that systems, apparatus, assemblies, products, devices, kits, methods, and/or processes, according to certain embodiments of the present disclosure may include, incorporate, or otherwise comprise properties, features, components, members, and/or elements described in other embodiments disclosed and/or described herein. Thus, reference to a specific feature in relation to one embodiment should not be construed as being limited to applications only within said embodiment.

The headings used herein are for organizational purposes only and are not meant to be used to limit the scope of the description or the claims.

Figure 2:
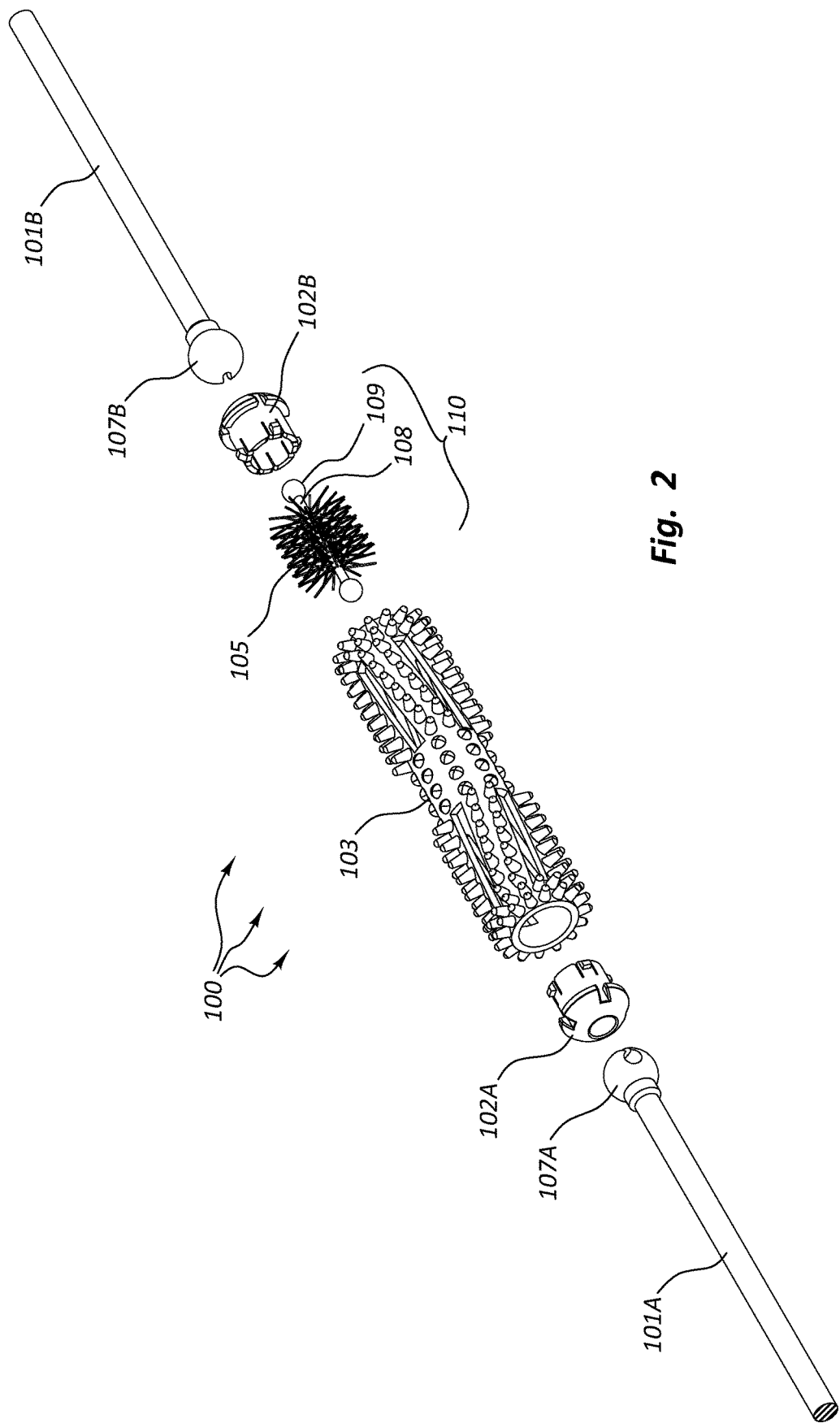
FIG. 2 illustrates an exploded perspective view of a tug-toy tooth brush.

As noted above, the embodiments described herein are directed to a tug-toy tooth brush. In one embodiment, as generally shown in FIGS. 1 and 2, the tug-toy tooth brush 100 includes the following: a structural frame 103 that provides support for at least one sliding element 110. The structural frame 103 includes channels 106 that guide the sliding element while sliding within the structural frame. The sliding element 110 may be configured to slide from a first position to a second position within the structural frame 103. The sliding element includes bristles 105 that extrude through the structural frame. The tug-toy tooth brush 100 also includes at least one handle 101A/101B attached to a distal end of the sliding element, where the handle is configured for travel through the structural frame.

At least in some embodiments, each part of the tug-toy tooth brush 100 (or "rotary toothbrush" or (chew toy" herein) is modular, and can be individually replaced or repaired. Each part is designed to perform a specified function. For example, the structural frame 103 is designed to house the sliding element(s) 110, provide support for the chew toy, and provide a place for an animal (such as a dog) to place its teeth. (Throughout this paper, a dog will be used as an example of an animal that could chew on the chew toy described herein; however, it will be understood that substantially any animal could use and have their teeth brushed by the chew toy). Thus, when a dog bites the structural frame 103, the dog's teeth will latch on to the frame. Specifically, the dog's teeth will latch over small perforations that may be interspersed throughout the frame, or onto the nubs 104 that protrude out of the frame 103.

These nubs, and the frame itself, may be formed using rubber, plastic or other material or combination of materials that is durable and can withstand repeated chewing. When the dog's mouth has wrapped around the structural frame 103, and the dog's teeth are holding the rotary toothbrush, the internal sliding element 110 may slide from one end of the toothbrush to the other end of the toothbrush. Indeed, the sliding element 110 may, for example, be initially positioned at the end near cap 102A, and may slide through the structural frame 103 along one or more slots or channels 106 to the end near cap 102B. As the internal sliding element 110 slides from one position to the other, the bristles 105 attached to the sliding element slide between the dog's teeth. This back-and-forth motion thus brushes and cleans the dog's teeth.

As shown in FIG. 2, the sliding element 110 may be moved through the structural frame 103 using a handle 101A and/or 101B. The handles 101A/101B attach to the sliding element 110 using a socket joint 102A/102B. The handle may itself have a ball joint 107A/107B which fits into the socket. The ball and socket then work together to attach the handle to the sliding element, but also allow the handle to be twisted and moved, while still maintaining the attachment. The socket joints 102A/102B also attach to the structural frame 103.

The sliding element 110 within the structural frame 103 may have a center pin or column 108 to which the toothbrush bristles 105 are attached. The center pin or column has ball joints 109 that extend through the socket joint and attach to the ball joints 107A/107B. Thus, in this manner, the internal sliding element 110 is free to spin or twist, thereby further increasing the functionality of the chew toy as a toothbrush. It should be noted that, while ball and socket joints have been described herein, substantially any type of joint or joining mechanism may be used to join the handles with the internal sliding element(s) and/or to the structural frame 103. The joint or joining mechanisms allow the internal sliding element 110 to be detached and replaced.

The structural frame 103 may include multiple openings that allow extrusion of the bristles 105. These openings may be large or small, and may be place in patterns or randomly over the structural frame 103. The openings may, for example, be designed to allow one or two bristles 105 to extend through the frame, or may be large enough to allow tens or hundreds of bristles through the frame. The bristles 105 may be uniform in length, or may vary in length. Similarly, the thickness of each bristle may be uniform, or the thickness may vary in different parts of the internal sliding element 110. In some embodiments, the structural frame 103 may house multiple sliding elements, each having its own set of bristles.

The sliding elements may be free to slide or twist in various directions, or may be guided along slots or channels 106 through the body of the frame 103. The channels may be vertical channels that guide the sliding element 110 in a vertical manner relative to the structural frame 103. Alternatively, the channels 106 may be diagonal channels that guide the sliding element 110 in a diagonal manner relative to the structural frame. Other channels may be spiral shaped, or otherwise designed to guide the movement of the sliding element. In some cases, the channels are designed to guide the bristles of the sliding element through a dog's teeth, so that the animal's teeth are brushed when playing with the tug-toy tooth brush.

Parts of the structural frame 103 may include nubs, bumps, ridges or other features extending from structural frame. These bumps and ridges may be designed to provide a better grip for a dog as it latches its teeth onto the chew toy. Because the internal sliding element 110 is held within the structural frame, the dog's tendency to hold on to the frame will allow the dog to grip the frame while the internal sliding element is free to move and drag the bristles over the dog's teeth. Indeed, when a dog's owner or caregiver grabs a handle (e.g. 101A), and the dog grabs the structural frame 103, the sliding element 110 will slide to the end opposite of where the owner is holding. Thus, if the dog's owner is holding handle 101A, and the dog bites the structural frame 103, then the sliding element will slide toward cap 102B, brushing the dog's teeth along the way. If the owner grabs the other handle 101B, then the sliding element 110 will slide toward cap 102A as the dog pulls the chew toy with a force opposite that of the owner's.

Accordingly, an owner or caregiver for a dog can play with the dog in a typical pull-and-tug manner, but while the playing is happening, the dog's teeth are being brushed by the back and forth motion. In cases where the tug-toy tooth brush only has one handle, the internal sliding element 110 may be spring loaded or otherwise caused to return to a given position within the frame 103. Thus, even if the rotary toothbrush 100 only has one handle (or is only using one of the handles), the toothbrush will still function as intended to brush the dog's teeth. The sliding element's center column or center pin may be constructed of metal or other durable material, and may include balls 109 or hooks or other means of fastening the sliding element 110 to a handle.

The bristles 105 may be press formed into the center column, or may be glued or otherwise fastened to the sliding element. In some cases, the bristles may be fastened to the center column 108 with a snap-fit connector or other type of connector that allows the bristles to be removed. As such, the bristles 105 can be replaced without replacing the entire sliding element 110. In other cases, the bristles are permanently attached to the center column and, as such, when worn down, the sliding element can be replaced as a whole. The sliding element is prevented from coming out of the structural frame 103 by end caps/socket joints 102A/102B. These end caps may have (or may themselves be) socket joints. The sliding element's center column 108 may be arranged such that it extends through the socket joint 102A and attaches to a hole in the ball joint 107A. Once the ball end 109 is slid into the hole, the sliding element 110 will be rotatably attached to the handle 101A.

Figure 4:
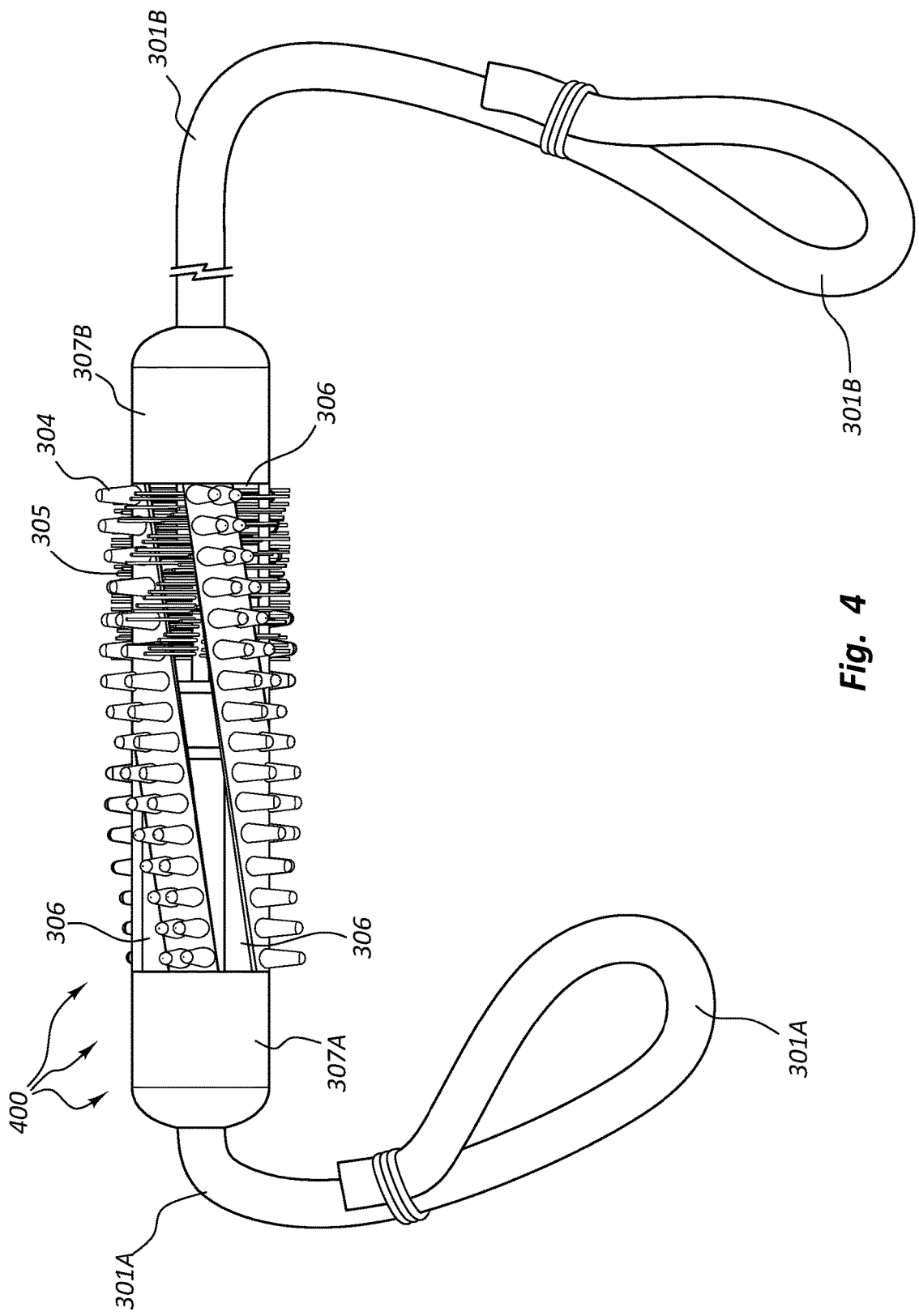
FIG. 4 illustrates a front perspective view of the alternative tug-toy tooth brush along with corresponding handles.

Many different types of handles may be used with the tug-toy tooth brush 100. For instance, as shown in FIG. 4, the chew toy 400 includes circular handles 401A and 401B. The circular handles allow a user to grab the handle and pull with a significant amount of force to counteract the pulling force of the dog. Similarly, in FIG. 5, the rotary toothbrush chew toy 500 has rubber grips 501A and 501B that allow a user to grab and hold onto the handles. Other types of grips and handles may be used including those of different shapes, different sizes or those made from different materials. Regardless of which type of grip or handle is used, the handles will be attached (or at least linked) to the sliding element 110 of FIG. 2.

The link between the handles 101A/101B of FIG. 1 and the sliding element 110 is what pulls the sliding element 110 back and forth between different positions within the structural frame 103. This sliding action is what moves the bristles 105 between the dog's teeth and thereby cleans the teeth. While in some cases only one handle may be used, typically the rotary toothbrush chew toy will include two handles. Each handle attaches either directly to the sliding element 110, or attaches to the sliding element via a joint such as a socket joint 102A/102B. The handles may have ball ends 107A/107B that fit into corresponding holes in the ball joints 107A/107B. Again, it should be noted that different types of joints may be used, including snap-fit joints, crimped joints, magnetized joints, spot-welded joints, or any other type of joint that could serve as a means of attaching a handle to a sliding element. In the embodiment shown in FIGS. 1 and 2, the socket joints 102A/102B are attached at opposite ends of the structural frame 103. This allows the sliding element 110 to slide from one end of the frame 103 to the other end, which in turn permits the bristles 105 to travel through the dog's left side teeth to the dog's right side teeth, and back again.

Figure 3:
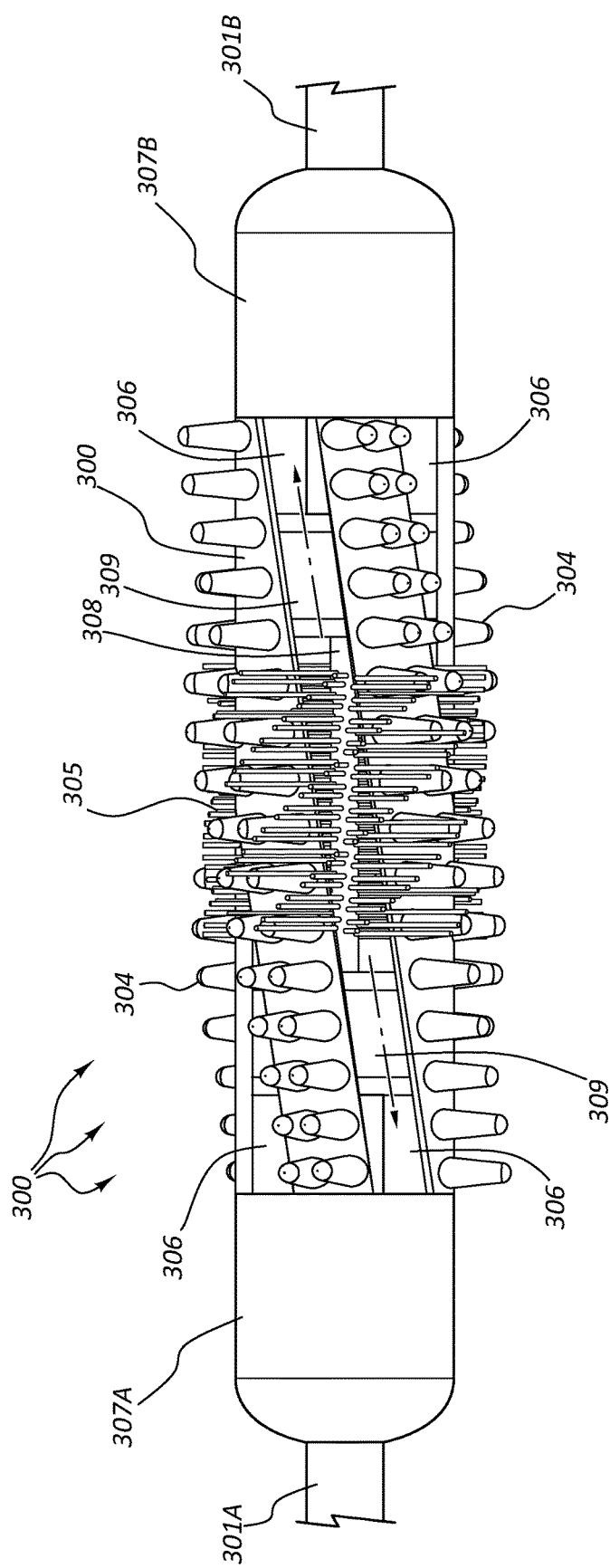
FIG. 3 illustrates a front perspective view of an alternative tug-toy tooth brush.

FIGS. 3 and 4 illustrate an embodiment of a tug-toy tooth brush of a different design. Specifically, the slots or channels 302 in the frame 301 are spiral-shaped. This causes the sliding element 303 to slide not just back and forth between the ends of the chew toy 300, but also to rotate in line with the spiral slots. In this manner, the bristles 304 of the sliding element 303 will rotate as well as slide laterally. Accordingly, an increased amount of brushing may take place in such scenarios, where the brushing includes both lateral motion and rotary motion.

In one specific embodiment, a tug-toy tooth brush is provided that includes an outer structure (e.g. structural frame 103) that houses an inner structure (e.g. sliding element 110). The outer structure includes perforations that facilitate contact with an animal's teeth. The inner structure is positioned within the outer structure, and the inner structure is permitted to move within the outer structure. The inner structure includes bristles 105 that extend through perforations of the outer structure. The tug-toy tooth brush also includes a handle 101A attached to one end of the inner structure. The handle is permitted to move through an opening in the outer structure. The tug-toy tooth brush also includes a handle 101B that is attached to the other end of the inner structure. The handle 101B is permitted to move through an opening on the opposite end of the outer structure.

The outer structure may have one or more perforations. These perforations may be distributed between one or more nubs 104 that are disposed over the surface of the outer structure. The perforations may be bigger or smaller than the nubs, and may take the place of certain nubs, or may be positioned between the nubs. In some cases, the perforations may be grouped together in patterns, or may be spread apart. Indeed, it will be understood that the nubs and perforations may be arranged in different patterns or shapes to increase contact with a dogs teeth and/or to allow more or fewer bristles to extend through the outer structure to reach the dog's teeth.

Figure 5:
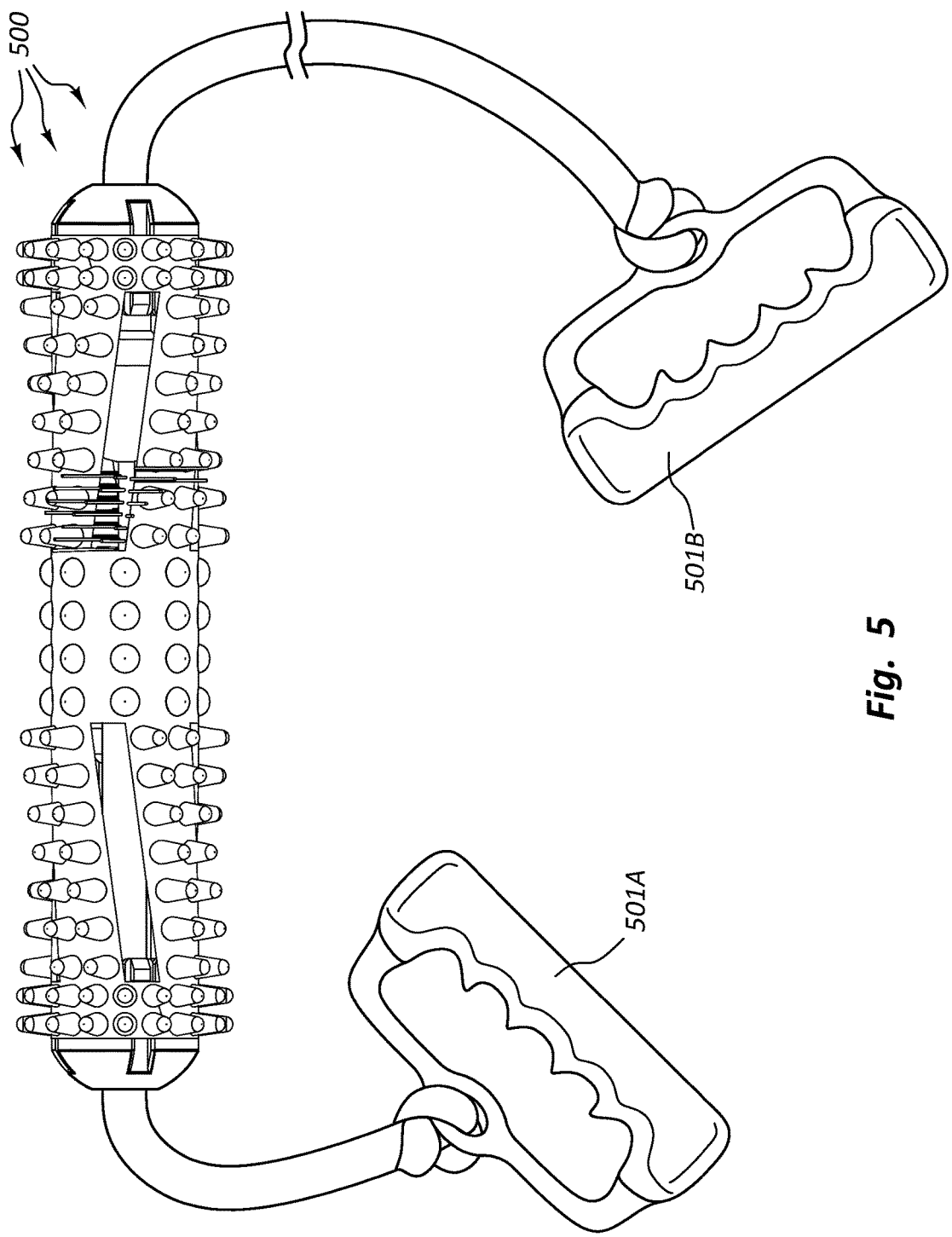
FIG. 5 illustrates a front perspective view of a tug-toy tooth brush having specialized handles.

The outer structure may include caps such as 102A/102B for each end of the outer structure. These caps place limits on how far the inner structure can move within the outer structure. In some cases, the outer structure may include vertical slots through which the bristles of the inner structure extend. In FIGS. 1 and 2, these vertical slots are angled towards the center, while in FIGS. 3 and 4, the slots are arced or spiral shaped. While in FIGS. 1-5, the outer structure is substantially cylindrical in shape, it will be understood that it may be formed in substantially any three-dimensional shape that is at least partially hollow to accommodate the inner structure. The outer structure may be attached to one or two handles, and these handles may include hand grips. As shown in FIG. 5, the hand grips 501A/501B may be attached perpendicular to the handles 502A/502B. As such, the grips may allow more pulling force to be applied to the handles, which is especially beneficial for larger dogs that are capable of stronger biting and pulling forces.

In another specific embodiment, a tug-toy tooth brush 100 is provided. The tug-toy tooth brush 100 includes a structural frame 103 that provides support for at least one sliding element 110. The structural frame includes channels 106 that guide or direct the sliding element while sliding within the structural frame 103. The sliding element 110 is configured to slide from a first position to a second position within the structural frame, as well as to multiple intermediary positions between the first and second positions (e.g. at end caps 102A and 102B). The sliding element includes bristles 105 that extrude through the structural frame 103. These bristles may be disposed on a center column 108 of the sliding element with a ball end 109 or other connector for attaching to the handle.

This embodiment of the tug-toy tooth brush, at least one handle (e.g. 101A) is attached to a distal end of the sliding element. The handle is configured to travel through the structural frame 103 as the sliding element travels between positions. The chew toy includes a first socket joint 102A that attaches to the first ball end of the sliding element's center column 108, and a second socket joint 102B that attaches to the second ball end (e.g. 109) of the sliding element's center column. The first handle 101A attaches to the first socket joint 102A via a ball end 107A of the first handle, and the second handle 101B attaches to the second socket joint 102B via a ball end 107B of the second handle. The structural frame 103 may be substantially cylindrical in shape, or may be square, rectangular or some other shape. In cases where the structural frame is cylindrical, the frame may include one or more arced slots through which the bristles of the sliding element extend.

Accordingly, various embodiments of a tug-toy tooth brush have been described. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A tug-toy tooth brush, comprising:
   a structural frame that provides support for at least one sliding element, the structural frame including one or more channels that guide the sliding element while sliding;
   the sliding element disposed within the structural frame, wherein the sliding element is configured to slide from a first position to a second position within the structural frame, the sliding element including one or more bristles that extrude through the structural frame; and
   at least one handle attached to a distal end of the sliding element, the handle being configured for travel through the structural frame,
   wherein the structural frame includes a plurality of nubs extending from at least a portion of the structural frame.

2. The tug-toy tooth brush of claim 1, wherein the structural frame includes a plurality of openings that allow extrusion of the bristles.

3. The tug-toy tooth brush of claim 1, wherein the channels comprise vertical channels that guide the sliding element in a vertical manner relative to the structural frame.

4. The tug-toy tooth brush of claim 1, wherein the channels comprise diagonal channels that guide the sliding element in a diagonal manner relative to the structural frame.

5. The tug-toy tooth brush of claim 1, wherein the channels guide the bristles of the sliding element through an animal's teeth, such that the animal's teeth are brushed when playing with the tug-toy tooth brush.

6. The tug-toy tooth brush of claim 1, wherein the sliding element includes a center column with first and second ball ends.

7. The tug-toy tooth brush of claim 6, wherein the one or more bristles are disposed on the center column of the sliding element.

8. The tug-toy tooth brush of claim 6, further comprising:
a first socket joint that attaches to the first ball end of the sliding element's center column; and
a second socket joint that attaches to the second ball end of the sliding element's center column;
wherein the at least one handle comprises a first handle and a second handle, wherein the first handle attaches to the first socket joint via a ball end of the first handle, and wherein the second handle attaches to the second socket joint via a ball end of the second handle.

9. The tug-toy tooth brush of claim 8, wherein the first and second socket joints are attached at opposite ends of the structural frame.

10. A tug-toy tooth brush, comprising:
an outer structure that houses an inner structure, the outer structure including one or more perforations that facilitate contact with teeth;
an inner structure positioned within the outer structure, wherein the inner structure is permitted to move within the outer structure, the inner structure including one or more bristles that extend through one or more perforations of the outer structure;
a first handle attached to a first end of the inner structure, wherein the first handle is permitted to move through a first opening in the outer structure; and
a second handle attached to a second end of the inner structure, wherein the second handle is permitted to move through a second opening in the outer structure.

11. The tug-toy tooth brush of claim 10, wherein the perforations on the outer structure are positioned between one or more nubs disposed on the outer structure.

12. The tug-toy tooth brush of claim 10, wherein the outer structure includes a cap for the first end and a cap for the second end, the first and second caps placing limits on how far the inner structure can move within the outer structure.

13. The tug-toy tooth brush of claim 10, wherein the outer structure includes one or more vertical slots through which the bristles of the inner structure extend.

14. The tug-toy tooth brush of claim 10, wherein the first and second handles include hand grips attached perpendicular to the handles.

15. The tug-toy tooth brush of claim 10, wherein the outer structure is substantially cylindrical in shape.

16. The tug-toy tooth brush of claim 10, wherein the inner structure is a standalone, replaceable part.

17. A tug-toy tooth brush, comprising:
a structural frame that provides support for at least one sliding element, the structural frame including one or more channels that guide the sliding element while sliding;
the sliding element disposed within the structural frame, wherein the sliding element is configured to slide from a first position to a second position within the structural frame, the sliding element including one or more bristles that extrude through the structural frame, the sliding element further including a center column with first and second ball ends;
at least one handle attached to a distal end of the sliding element, the handle being configured for travel through the structural frame;
a first socket joint that attaches to the first ball end of the sliding element's center column; and
a second socket joint that attaches to the second ball end of the sliding element's center column;
wherein the at least one handle comprises a first handle and a second handle, wherein the first handle attaches to the first socket joint via a ball end of the first handle, and wherein the second handle attaches to the second socket joint via a ball end of the second handle.

18. The tug-toy tooth brush of claim 17, wherein the structural frame is substantially cylindrical in shape.

19. The tug-toy tooth brush of claim 18, wherein the cylindrical structural frame includes one or more arced slots through which the bristles of the sliding element extend.

* * * * *